United States Patent
Kim

(10) Patent No.: US 9,420,141 B2
(45) Date of Patent: Aug. 16, 2016

(54) POSITION ADJUSTMENT APPARATUS OF IMAGING UNIT, THE IMAGING UNIT, AND IMAGE READING APPARATUS INCLUDING THE IMAGING UNIT

(71) Applicant: SAMSUNG ELECTRONICS CO., LTD., Suwon-si, Gyeonggi-do (KR)

(72) Inventor: Kyung-rok Kim, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/517,236

(22) Filed: Oct. 17, 2014

(65) Prior Publication Data

US 2015/0116787 A1    Apr. 30, 2015

(30) Foreign Application Priority Data

Oct. 29, 2013    (KR) .......................... 10-2013-0129569

(51) Int. Cl.
*H04N 1/053*    (2006.01)
*H04N 1/00*    (2006.01)
(Continued)

(52) U.S. Cl.
CPC ................. *H04N 1/053* (2013.01); *G02B 7/00* (2013.01); *H04N 1/0066* (2013.01); *H04N 1/00557* (2013.01); *H04N 1/00559* (2013.01); *H04N 1/0249* (2013.01); *H04N 1/02409* (2013.01); *H04N 1/02481* (2013.01); *H04N 1/0301* (2013.01); *H04N 1/0303* (2013.01); *H04N 1/0305* (2013.01); *H04N 1/047* (2013.01);

(Continued)

(58) Field of Classification Search
USPC ......................................................... 358/406
See application file for complete search history.

(56) References Cited

U.S. PATENT DOCUMENTS 5,247,316 A * 9/1993 Komori .................. G03G 15/65
                                                  347/108
5,663,806 A    9/1997 Grise et al.
(Continued)

FOREIGN PATENT DOCUMENTS

JP    2000-261611    9/2000
JP    2009-177234    8/2009
(Continued)

OTHER PUBLICATIONS

International Search Report and Written Opinion dated Jan. 16, 2015 from International Application No. PCT/KR2014/010225, 8 pages.
(Continued)

*Primary Examiner* — Allen H Nguyen
(74) *Attorney, Agent, or Firm* — Staas & Halsey LLP

(57) ABSTRACT

A position adjustment apparatus couples an imaging unit, which includes an imaging sensor and a focusing lens unit, to a base frame and is capable of adjusting a position of the imaging unit. The image sensor reads a document image and the focusing lens unit forms the document image by using the image sensor. The position adjustment apparatus may include an adjustment frame on which the focusing lens unit and the image sensor are installed, a height fixing member for coupling the adjustment frame to the base frame so as to fix a height of the adjustment frame at a fixed support position, and first and second adjustment members for coupling the adjustment frame to the base frame so as to adjust the height of the adjustment frame at first and second adjustable support positions. An image reading apparatus may include the imaging unit and the position adjustment apparatus.

33 Claims, 15 Drawing Sheets

(51) Int. Cl.
   *G02B 7/00* (2006.01)
   *H04N 1/024* (2006.01)
   *H04N 1/03* (2006.01)
   *H04N 1/047* (2006.01)

(52) U.S. Cl.
   CPC *H04N2201/0081* (2013.01); *H04N 2201/0094* (2013.01); *H04N 2201/02429* (2013.01); *H04N 2201/02431* (2013.01); *H04N 2201/02441* (2013.01); *H04N 2201/02456* (2013.01); *H04N 2201/02458* (2013.01); *H04N 2201/02468* (2013.01); *H04N 2201/04755* (2013.01); *H04N 2201/04796* (2013.01)

(56) References Cited

U.S. PATENT DOCUMENTS

| | | | |
|---|---|---|---|
| 5,933,248 A | 8/1999 | Hirata | |
| 6,424,434 B1 | 7/2002 | Uchida | |
| 7,235,769 B2 * | 6/2007 | Uemura | H04N 1/0408 250/208.1 |
| 7,561,348 B2 * | 7/2009 | Nakajima et al. | G02B 7/021 359/811 |
| 7,588,314 B1 * | 9/2009 | Nisnevich | B41J 2/16526 347/104 |
| 7,714,893 B2 * | 5/2010 | Makii | G02B 27/646 348/208.4 |
| 2002/0121590 A1 * | 9/2002 | Yoshida | H04N 1/0408 250/208.1 |
| 2004/0223205 A1 | 11/2004 | Aoyama et al. | |
| 2007/0103737 A1 | 5/2007 | Nakajima | |
| 2007/0253731 A1 | 11/2007 | Nakajima | |
| 2007/0279709 A1 | 12/2007 | Yamada | |
| 2012/0176653 A1 | 7/2012 | Washida | |

FOREIGN PATENT DOCUMENTS

| | | |
|---|---|---|
| JP | 2012-145780 | 8/2012 |
| KR | 10-2007-0115567 | 12/2007 |

OTHER PUBLICATIONS

Extended European Search Report dated Jan. 23, 2015 from European Patent Application No. 14190769.1, 4 pages.

* cited by examiner

POSITION ADJUSTMENT APPARATUS OF IMAGING UNIT, THE IMAGING UNIT, AND IMAGE READING APPARATUS INCLUDING THE IMAGING UNIT

CROSS-REFERENCE TO RELATED APPLICATIONS

This application claims the benefit of Korean Patent Application No. 10-2013-0129569, filed on Oct. 29, 2013, in the Korean Intellectual Property Office, the disclosure of which is incorporated herein in its entirety by reference.

BACKGROUND

1. Field

One or more embodiments of the disclosure relate to a position adjustment apparatus of an imaging unit, the imaging unit, and an image reading apparatus including the imaging unit, and more particularly, to an image sensor that reads image information recorded on a document, a position adjustment apparatus of an imaging unit that adjusts a position of a focusing optics, and an image reading apparatus including the imaging unit.

2. Description of the Related Art

An image reading apparatus, such as a copier, a fax machine, and a scanner, irradiates light to a document, receives light reflected from the document by using an image sensor, reads image information, and converts the light into an electrical signal.

The image reading apparatus may include a light source that generates light, the image sensor that receives the light reflected from the document and converts the light into the electrical signal, and a focusing lens that is disposed on a light path from the light source and the image sensor and focuses a document image onto the image sensor.

A size of the image sensor is generally smaller than that of the document, and thus the focusing lens is generally a reduction optical system. For the image reading apparatus that uses the reduction optical system, it is very difficult to assemble the image sensor positioned in a rear end of the focusing lens at a position at which optimal focusing performance is implemented. This is because the sensitivity of a position change increases at a reciprocal number (i.e., inversely) of a reduction magnification due to characteristics of the reduction optical system.

For example, FIG. 1 is a perspective view of a conventional adjustment structure of an imaging unit of an image reading apparatus, and FIGS. 2A through 2C are conceptual diagrams of an image sensor 18 that is adjusted in upper and lower directions in the imaging unit of the conventional image reading apparatus of FIG. 1. Referring to FIGS. 1 through 2C, in the conventional adjustment structure, a focusing lens 12 is fixed to a fixing plate 11 by using a lens holder 13, and a sensor module substrate 14, on which the image sensor 18 is mounted, is installed and adjusted with respect to the fixing plate 11. If the sensor module substrate 14 adjusts an image skew and a Y-position through movement and rotation in upper and lower directions with respect to the fixing plate 11, the sensor module substrate 14 is fixed to the fixing plate 11 by using a fastening member such as a bracket 15 and a screw 16. In this case, reduced images of a rear end of the focusing lens 12 and the image sensor 18 are aligned, and thus adjustment sensitivity greatly increases. When the screw 16 is fixed after the adjustment, subtle movement and rotation of the bracket 15 that are caused by a rotation of the screw 16 lead to a very high skew error and Y-position error.

In more detail, when the focusing lens 12 and the image sensor 18 are aligned at a reference position, as shown in FIG. 2A, if a scan image read by the image sensor 18 is biased in a direction 21, as shown in FIG. 2B, the Y-position of the image sensor 18 is adjusted to a +Y-position so that the scan image read by the image sensor 18 may be positioned on a regular position. Likewise, when the scan image read by the image sensor 18 is biased in another direction 23, as shown in FIG. 2C, the Y-position of the image sensor 18 is adjusted to a −Y-position so that the scan image read by the image sensor 18 may be located on the regular position. A reflective mirror 19 guides a light path from a document image to the focusing lens 12 and the image sensor 18. When optics of the focusing lens 12 is a 0.1 reduction optical system, the document image having a width of 1 mm is focused as a 0.1 mm image in the rear end of the focusing lens 12. This means that a focusing accuracy is changed to 1 mm (that is 10 is obtained based on the inverse of 0.1 which corresponds to a reciprocal number of a reduction rate with respect to a position change of 0.1 mm of the image sensor 18). Deviations 20, 22 of the Y-position of the image sensor 18 cause deviations 21, 23 that are magnified by 10 times in a document. That is, according to the related art, the position of the image sensor 18 is adjusted in the rear end of the focusing lens 12, which results in an increase in the adjustment sensitivity as the reciprocal number (inverse) of the reduction rate of the reduction optical system.

SUMMARY

One or more embodiments of the disclosure include a position adjustment apparatus of an imaging unit, the imaging unit, and an image reading apparatus including the imaging unit in which since a position adjustment of an image sensor results in an increase in a sensitivity as a reciprocal number (inverse) of a reduction rate of a reduction optical system as described in the related art above, a high sensitivity causes an operability drop in aligning and assembling the image sensor, and a production quality deteriorates.

Additional aspects will be set forth in part in the description which follows and, in part, will be apparent from the description, or may be learned by practice of the disclosed embodiments.

According to one or more embodiments of the disclosure, a position adjustment apparatus couples an imaging unit to a base frame so as to adjust a position of the imaging unit. The imaging unit may include an image sensor for reading a document image and a focusing lens unit for forming the document image by using the image sensor. The position adjustment apparatus may include: an adjustment frame on which the focusing lens unit and the image sensor are installed, a height fixing member for coupling the adjustment frame to the base frame so as to fix a height of the adjustment frame at a fixed support position, and first and second adjustment members for coupling the adjustment frame to the base frame so as to adjust the height of the adjustment frame at first and second adjustable support positions.

The adjustment frame may be supported at three points with respect to the base frame.

The first adjustment member may be positioned near a front end of the focusing lens unit, and the second adjustment member and the height fixing member may be positioned near a rear end of the focusing lens unit.

The first adjustable support position may be disposed below or along an optical axis of the focusing lens unit, and the fixed support position and the second adjustable support position may deviate from the optical axis of the focusing lens unit.

The first adjustment member may adjust a scan registration position of the document image of the imaging unit, and the second adjustment member may adjust a scan skew of the document image of the imaging unit.

The fixed support position and the second adjustable support position may be on a line perpendicular to the optical axis of the focusing lens unit.

The fixed support position, the first adjustable support position, and the second adjustable support position may be aligned at apexes of an isosceles triangle.

The position adjustment apparatus may further include: a pressure member for pressing the adjustment frame with respect to the base frame, wherein the first and second adjustment members and the height fixing member support the adjustment frame in an opposite direction to a direction in which the adjustment frame is pressed to the base frame.

The pressure member may be an elastic pressure member that elastically presses the adjustment frame.

The first and second adjustment members may be screw members.

The adjustment frame may include an adjustment plate that is supported by the first and second adjustment members and the height fixing member and on which the focusing lens unit is installed, a sensor module substrate on which the image sensor is installed, and a bracket for coupling the sensor module substrate to the adjustment plate.

The bracket may couple the sensor module substrate to the adjustment plate so as to fix the sensor module substrate with respect to a rotation direction around the optical axis of the focusing lens unit and upper and lower directions of a plate surface of the adjustment plate.

The bracket may couple the sensor module substrate to the adjustment plate so as to adjust a distance from the sensor module substrate to an optical axis direction of the focusing lens unit.

The focusing lens unit may be a reduction optical system.

The image sensor may be a line image sensor having an extending line sensor surface, and is aligned such that a length direction of the line sensor surface is the same as a main scan direction of the document image.

According to one or more embodiments of the disclosure, an imaging unit may include: a base frame, an image sensor for reading a document image, a focusing lens unit for forming the document image by using the image sensor, and a position adjustment apparatus on which the focusing lens unit and the image sensor are installed and for coupling the focusing lens unit and the image sensor to the base frame so as to adjust positions of the focusing lens unit and the image sensor. The position adjustment apparatus may include: an adjustment frame on which the focusing lens unit and the image sensor are installed, a height fixing member for coupling the adjustment frame to the base frame so as to fix a height of the adjustment frame at a fixed support position, and first and second adjustment members for coupling the adjustment frame to the base frame so as to adjust the height of the adjustment frame at first and second adjustable support positions.

According to one or more embodiments of the disclosure, an image reading apparatus may include: a document stand and an imaging unit for detecting an image from the document stand. The imaging unit may include: a base frame, an image sensor for reading a document image, a focusing lens unit for forming the document image by using the image sensor, and a position adjustment apparatus on which the focusing lens unit and the image sensor are installed and for coupling the focusing lens unit and the image sensor to the base frame so as to adjust positions of the focusing lens unit and the image sensor. The position adjustment apparatus may include: an adjustment frame on which the focusing lens unit and the image sensor are installed, a height fixing member for coupling the adjustment frame to the base frame so as to fix a height of the adjustment frame at a fixed support position, and first and second adjustment members for coupling the adjustment frame to the base frame so as to adjust the height of the adjustment frame at first and second adjustable support positions.

The image reading apparatus may further include: a light path changing unit for changing a light path to allow light coming from the document stand to face the imaging unit.

The imaging unit may be fixed to the document stand, and the light path changing unit may include a first traveling unit for moving at a scan speed in a scan direction with respect to the document stand and a second traveling unit for moving at half the scan speed in the scan direction with respect to the document stand.

The imaging unit and the light path changing unit may travel in the scan direction with respect to the document stand.

The image reading apparatus may further include a document feeding apparatus for moving a document to the document stand.

According to one or more embodiments of the disclosure, an image forming apparatus may include: an image reading apparatus which may include a document stand and an imaging unit to detect an image from the document stand, and a printing unit for printing an image on a sheet according to an electrophotographic process. The imaging may include: a base frame; an image sensor for reading a document image; a focusing lens unit for forming the document image by using the image sensor; and a position adjustment apparatus on which the focusing lens unit and the image sensor are installed and for coupling the focusing lens unit and the image sensor to the base frame so as to adjust positions of the focusing lens unit and the image sensor. The position adjustment apparatus may include: an adjustment frame on which the focusing lens unit and the image sensor are installed; a height fixing member for coupling the adjustment frame to the base frame so as to fix a height of the adjustment frame at a fixed support position; and first and second adjustment members for coupling the adjustment frame to the base frame so as to adjust the height of the adjustment frame at first and second adjustable support positions.

The image forming apparatus may be a copier or a multi-functional machine.

According to one or more embodiments of the disclosure, a method for adjusting a position of an imaging unit coupled to a base frame may include: fixing a height of an adjustment frame, on which a focusing lens unit and an image sensor of the imaging unit are installed, using a height fixing member which couples the adjustment frame to the base frame at a fixed support position, and rotating a first adjustment member which couples the adjustment frame to the base frame at a first adjustable support position, causing one end of the adjustment frame to be raised or lowered relative to the fixed support position.

The rotating of the first adjustment member in a first direction may cause the image sensor, focusing lens unit, and the adjustment frame to be rotated at a same time in a second direction which is opposite of the first direction.

The rotating of the first adjustment member may further include adjusting a position at which a document is scanned by the imaging unit, in a scan direction of the document or a direction opposite of the scan direction.

The method may further include rotating a second adjustment member which couples the adjustment frame to the base frame at a second adjustable support position, causing another end of the adjustment frame to be raised or lowered relative to the fixed support position. The rotating of the second adjustment member in a first direction may cause the image sensor, focusing lens unit, and the adjustment frame to be rotated at a same time in a second direction which is opposite of the first direction.

The rotating of the second adjustment member may further include adjusting a skew of the imaging unit and aligning a skew of a scan image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
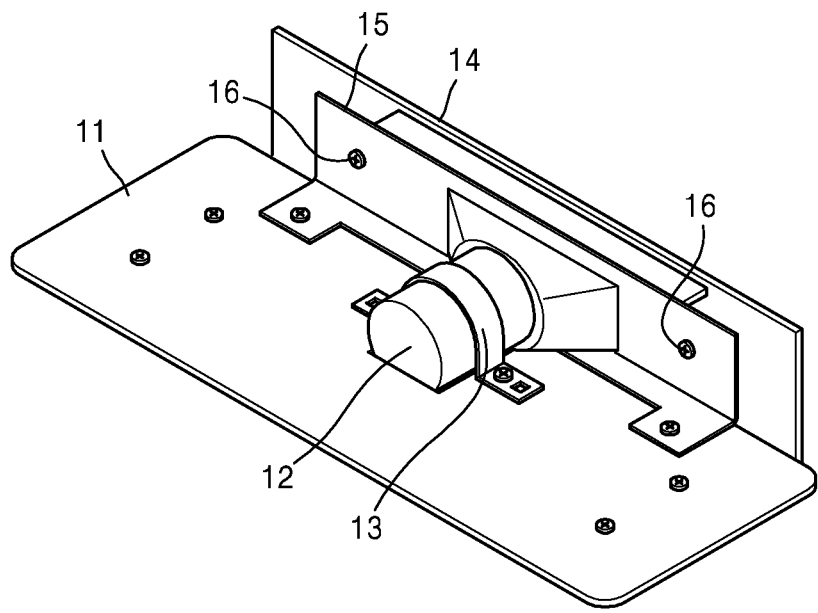
FIG. 1 is a schematic perspective view of a conventional adjustment structure of an imaging unit of an image reading apparatus.

Reference will now be made in detail to embodiments, examples of which are illustrated in the accompanying drawings, wherein like reference numerals refer to like elements throughout. In this regard, the disclosed embodiments may have different forms and should not be construed as being limited to the descriptions set forth herein. Accordingly, the embodiments are merely described below, by referring to the figures, to explain aspects of the disclosure.

Advantages and features of one or more embodiments of the disclosure and methods of accomplishing the same may be understood more readily by reference to the following detailed description of the embodiments and the accompanying drawings. In this regard, the disclosed embodiments may have different forms and should not be construed as being limited to the descriptions set forth herein. Rather, these embodiments are provided so that this disclosure will be thorough and complete and will fully convey the concept of the disclosed embodiments to one of ordinary skill in the art, and the disclosure will only be defined by the appended claims.

Hereinafter, the terms used in the specification will now be briefly discussed, and the embodiments will now be described in detail.

All terms including descriptive or technical terms which are used herein should be construed as having meanings that are known to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein should be understood based on the meaning of the terms together with the description throughout the specification.

When a part "includes" or "comprises" an element, unless there is a particular description contrary thereto, the part can further include other elements, not excluding the other elements. As used herein, the term "and/or" includes any and all combinations of one or more of the associated listed items.

Figure 3:
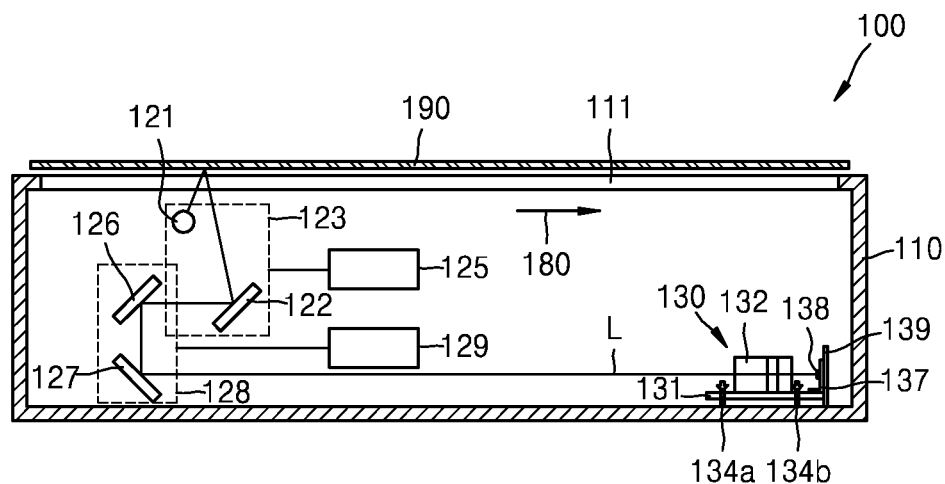
FIG. 3 is a schematic diagram of a configuration of an image reading apparatus according to an embodiment of the disclosure.
Figure 4:
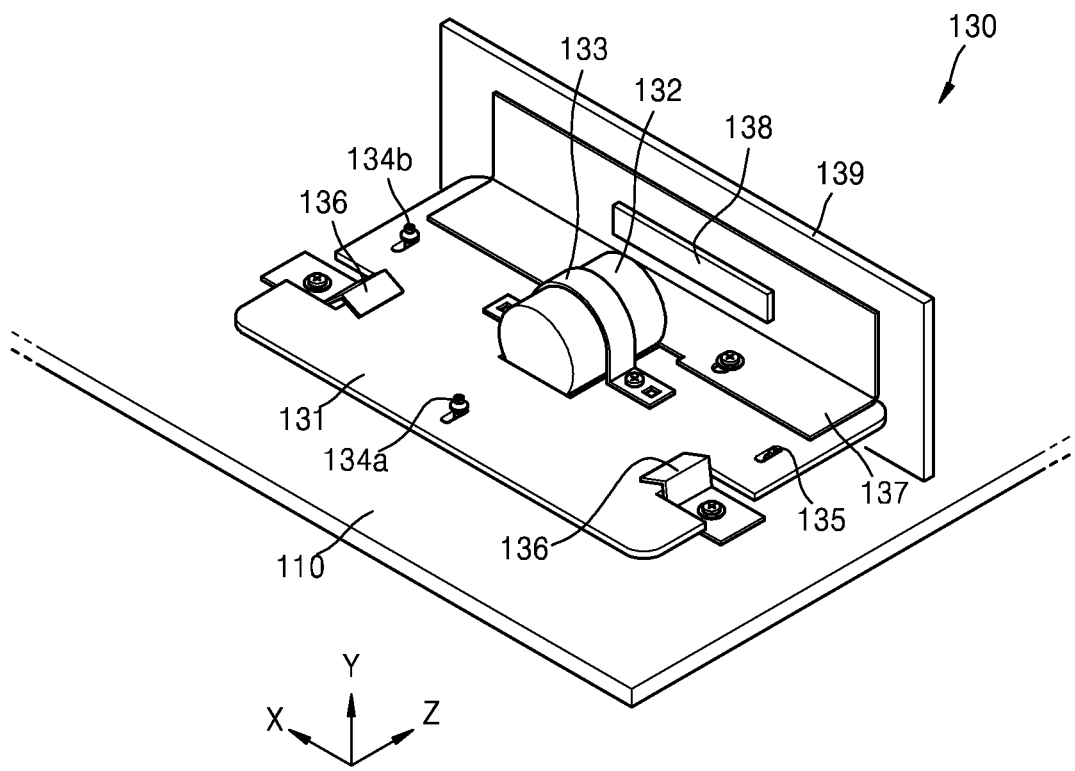
FIG. 4 is a schematic perspective view of a position adjustment apparatus of an imaging unit included in the image reading apparatus of FIG. 3.

FIG. 3 is a schematic diagram of a configuration or arrangement of an image reading apparatus 100 according to an embodiment of the disclosure. FIG. 4 is a schematic perspective view of a position adjustment apparatus of an imaging unit 130 included in the image reading apparatus 100 of FIG. 3.

Referring to FIG. 3, the image reading apparatus 100 may include a housing 110 and the imaging unit 130 mounted in the housing 110.

A document stand 111 on which a document 190 is placed may be provided on an upper side of the housing 110. The document stand 111 may include a platen and may be formed of a transparent material such as glass through which light may transmit.

First and second traveling units 123 and 128 (denoted by the dashed lines in FIG. 3) that transfer light reflected from the document 190 to the imaging unit 130 are provided below the document stand 111. The first traveling unit 123 may include a light source 121 and a first reflective mirror 122. An illumination light emitted from the light source 121 is reflected on the document 190 through the document stand 111. The first reflective mirror 122 reflects the light reflected from the document 190 to the second traveling unit 128. The second traveling unit 128 may include second and third reflective mirrors 126 and 127 that transfer light L reflected from the first traveling unit 123 to the imaging unit 130. The first through third reflective mirrors 123, 126, and 127 are examples of light path changing units that change a light path. The first traveling unit 123 may scan a reading page of the document 190 while being moved below the document stand 111 in one direction (a scan direction) 180 by a first driving unit 125. The second traveling unit 128 may be moved below the document stand 111 in the scan direction 180 by a second driving unit 129. For example, the second traveling unit 128 may be moved below the document stand 111 in the scan direction 180 by a second driving unit 129 at half the traveling speed of the first traveling unit 123, and may offset a length of the light path that changes according to a movement of the first traveling unit 123, and may maintain a consistent total distance of the light path between the document 190 and the imaging unit 130. Although the first and second traveling units 123 and 128 may be independently driven by the first and second driving units 125 and 129 as shown in FIG. 3, the first and second traveling units 123 and 128 may alternatively be driven by one driving unit.

Referring to FIG. 4, the imaging unit 130 may include a focusing lens unit 132 and an image sensor 138.

Figure 7:
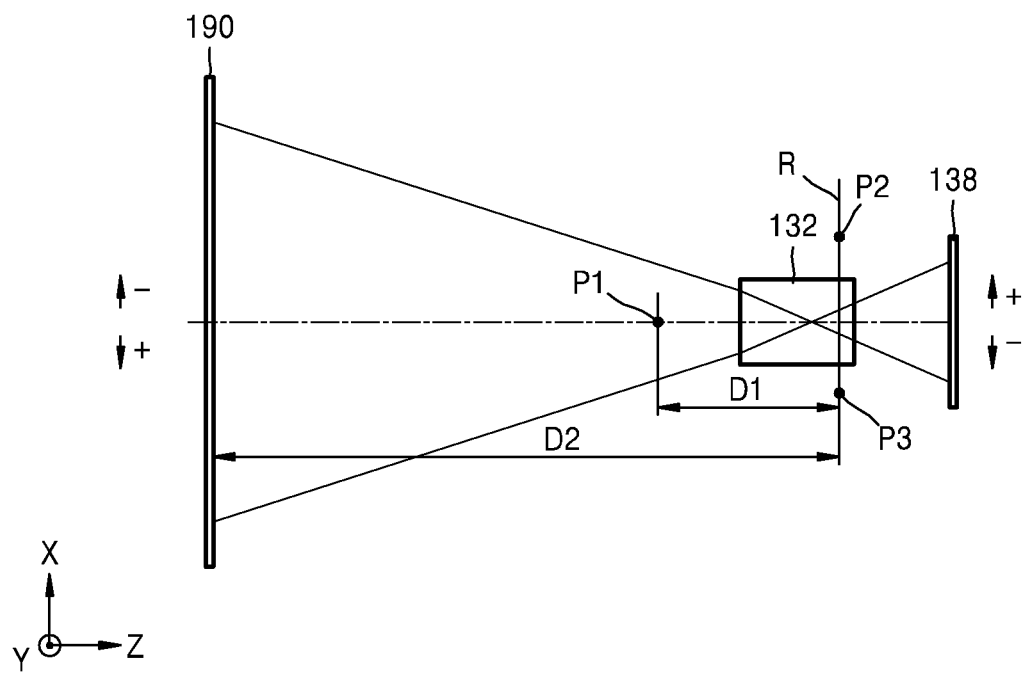
FIG. 7 is a schematic diagram of an optics structure of the imaging unit of FIG. 4 and support points of a position adjustment.

The focusing lens unit 132 may be configured or arranged as a lens sheet or a plurality of sheets of lenses. The lens sheet or the plurality of sheets of lenses of the focusing lens unit 132 may be installed on an adjustment plate 131 by fixing a focus distance by using a lens holder 133. The focusing lens unit 132 may be a reduction optical system that focuses a width of the document 190 in an X direction in accordance with a width of the image sensor 138 in a length direction, as shown in FIG. 7.

The image sensor 138 may be, for example, a charge-coupled device (CCD) image sensor, a complementary metal oxide semiconductor (CMOS) image sensor, etc. The image sensor 138 may be mounted on a sensor module substrate 139. The sensor module substrate 139 may be coupled to the adjustment plate 131 by using a bracket 137. During an assembly process of coupling the sensor module substrate 139 to the adjustment plate 131, the sensor module substrate 139 may be fixed to the adjustment plate 131 by using the bracket 137 by adjusting a position of the focusing lens unit 132 in an optical axis direction (a Z axis direction). As shown in FIG. 4, the bracket 137 may be coupled to the adjustment plate 131 using one or more fastening members (e.g., a screw, a bolt, a pin, a rivet, an anchor, an adhesive, and the like). Similarly, the bracket 137 may be coupled to the sensor module substrate 139 using one or more fastening members. Although the adjustment plate 131 and the sensor module substrate 139 are assembled in the disclosed embodiment (e.g., the adjustment plate 131 and the sensor module substrate 139 are coupled together via the bracket 137), the adjustment plate 131 and the sensor module substrate 139 may be formed in a single frame (e.g., the adjustment plate 131 and the sensor module substrate 139 may be formed as a single continuous piece).

The adjustment plate 131 may be installed on the housing 110. Alternatively, a separately fixed chassis (not shown) may be provided in the housing 1110, and the adjustment plate 131 may be installed in the chassis. As described later, positions of the focusing lens unit 132 and the image sensor 138 may be adjusted as a whole when the adjustment plate 131 is installed on the housing 110.

The adjustment plate 131 may be supported on the housing 110 at three points (e.g., P1, P2, and P3) by using first and second adjustment members 134a and 134b and a height fixing member 135. The first adjustment member 134a may be disposed near a front end of the focusing lens unit 132. The second adjustment member 134b and the height fixing member 135 may be disposed near a rear end of the focusing lens unit 132. Here, the front end of the focusing lens unit 132 may refer to a side of the focusing lens unit 132 which is closer to the light source 121 (e.g., in the Z direction) than the rear end of the focusing lens unit 132. The rear end of the focusing lens unit 132 may refer to a side of the focusing lens unit 132 which is closer to the image sensor 138 (e.g., in the Z direction) than the front end of the focusing lens unit 132. A first adjustable support point P1 of the adjustment plate 131 supported by the first adjustment member 134a may be positioned vertically below an optical axis of the focusing lens unit 132, and a second adjustable support point P2 and a fixed support point P3 of the adjustment plate 131 supported by the second adjustment member 134b and the height fixing member 135 may deviate from the optical axis of the focusing lens unit 132, as shown in FIG. 7 (e.g., second adjustable support point P2 may be disposed at a position which is offset from the optical axis in a first X direction, and the fixed support point P3 may be disposed at a position which is offset from the optical axis in a second X direction). Further, the second adjustable support point P2 and the fixed support point P3 may be positioned on a line (that is, a main scan direction R of FIG. 7) orthogonal to the optical axis of the focusing lens unit 132. Furthermore, the first adjustable support point P1 may be a position corresponding to an apex of an isosceles triangle on a symmetrical axis that is the optical axis of the focusing lens unit 132, and the second adjustable support point P2 and the fixed support point P3 may be positioned corresponding to the other two apexes of the isosceles triangle. That is, the three points P1, P2, and P3 when connected together may form a triangle, for example an isosceles triangle, and a line corresponding to the height of the formed isosceles triangle may coincide with the optical axis.

Figure 5:
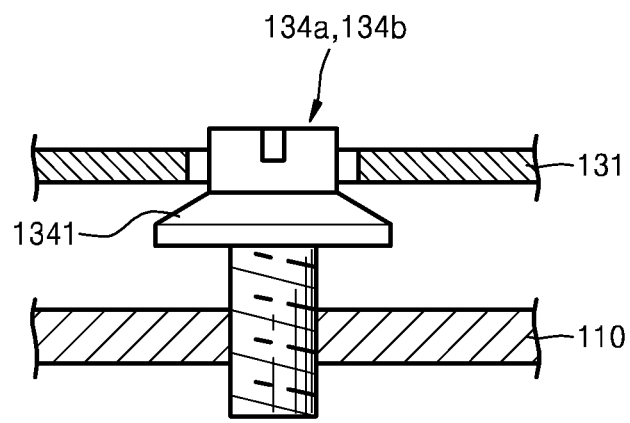
FIG. 5 is a schematic diagram of a first adjustment member of the position adjustment apparatus of the image reading apparatus of FIG. 4.
Figure 6:
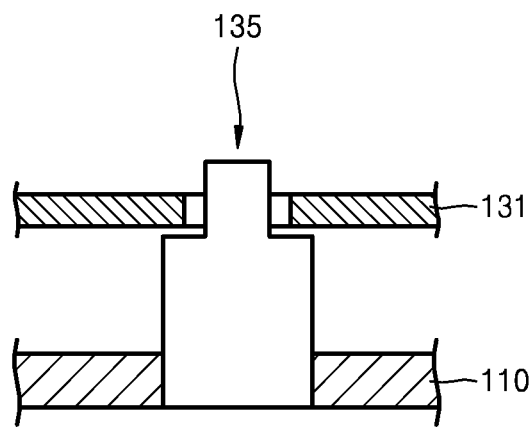
FIG. 6 is a schematic diagram of a height fixing member of the position adjustment apparatus of the image reading apparatus of FIG. 4.

The first and second adjustment members 134a and 134b may be in a form of a fastening member (e.g., a screw) of which a height is adjusted as shown in FIG. 5. The first and second adjustment members 134a and 134b may support the adjustment plate 131 upward (i.e., +Y direction) with respect to the housing 110 by positioning a support protrusion 1341 below the adjustment plate 131. The first and second adjustment members 134a and 134b may be screws having grooves used to rotate the screws at screw heads, as shown in FIG. 5, but are not limited thereto. Screw shapes of the first and second adjustment members 134a and 134b may be modified to shapes of anchor bolts having heads curved at right angles. Further, cams or well-known devices capable of (suitable for, adapted to, configured to, arranged to, operable to, etc.) adjusting a support height may be employed as the first and second adjustment members 134a and 134b.

The height fixing member 135 may be a simple supporter that supports the adjustment plate 131 by fixing a height thereof.

A pressure member 136 that presses the adjustment plate 131 to the housing 110 downward (i.e., −Y direction) may be provided. The pressure member 136 may be positioned between the first and second adjustment members 134a and 134b with respect to the optical axis direction (i.e., Z direction) of the focusing lens unit 132. The pressure member 136 may be, for example, an elastic pressure member such as a plate spring. The pressure member 136 may fix the adjustment plate 131 supported by the first and second adjustment members 134a and 134b and the height fixing member 135 by being pressed in the −Y direction, as shown in FIG. 4. As shown in FIG. 4, a groove or channel may be disposed along one or both sides of the adjustment plate 131 which are parallel to the z-direction, and the pressure member 136 may be disposed in the groove(s) or channel(s). The pressure member 136 may be fixed or coupled to the housing 110 using one or more fastening members (e.g., a screw, a bolt, a pin, a rivet, an anchor, an adhesive, and the like).

A process of assembling the imaging unit 130 in the housing 110 of the image reading apparatus 100 may include an operation of adjusting a position of the imaging unit 130. As a scan test result of the imaging unit 130 provisionally assembled in the housing 110, the position of the imaging unit 130 is necessarily adjusted if a start point of a scan image is not correct (i.e., a scan registration is wrong) or a scan line of the scan image is inclined (i.e. a skew occurs).

A scan registration adjustment of the imaging unit 130 is described with reference to FIGS. 8A through 9C.

Figure 8A:
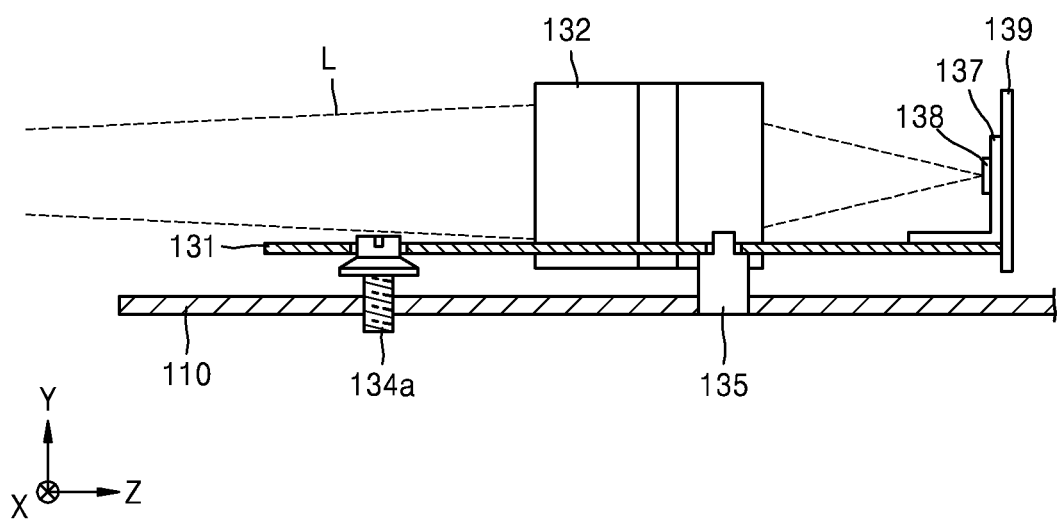
FIGS. 8A through 8C are schematic diagrams for explaining an adjustment of the first adjustment member of the imaging unit of FIG. 4.
Figure 8B:
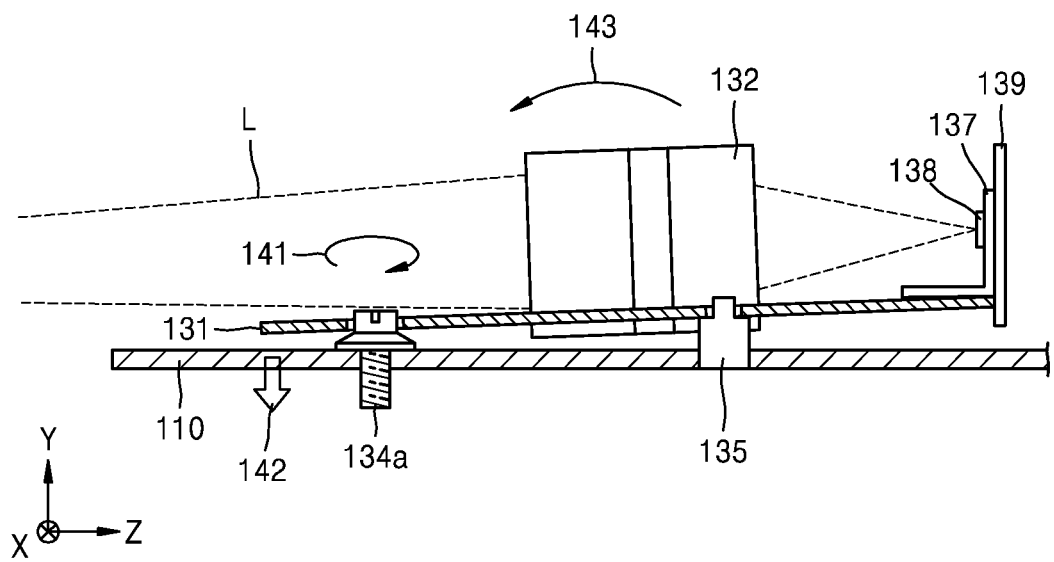
Figure 8C:
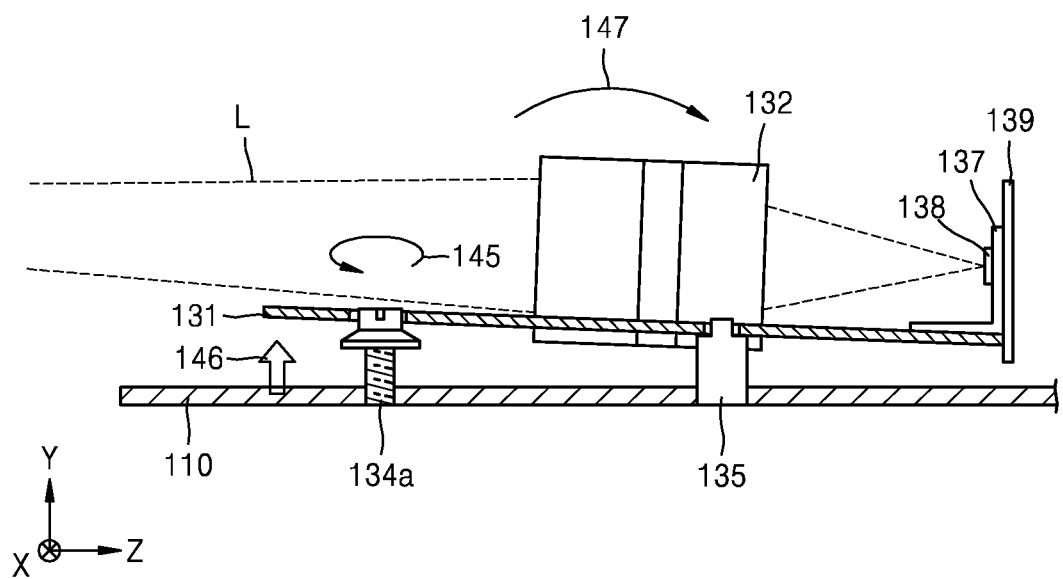
Figure 9A:
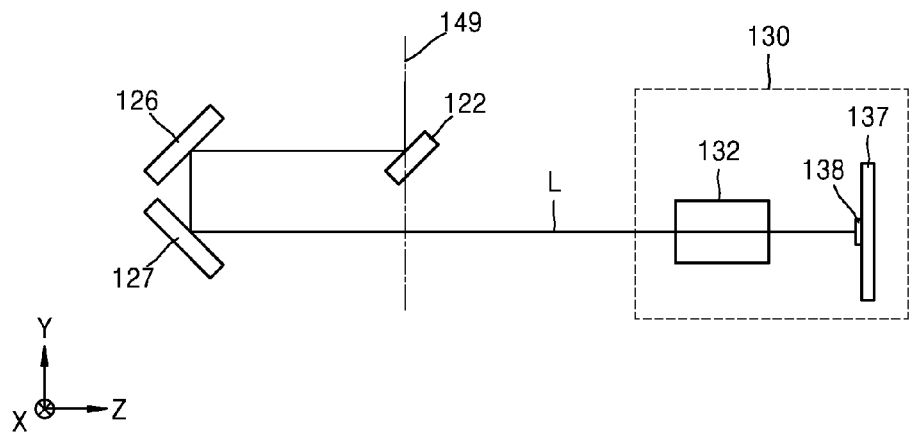
FIGS. 9A through 9C are schematic diagrams for explaining an adjustment of a scan registration according to the adjustment of the first adjustment member of FIGS. 8A through 8C.
Figure 9B:
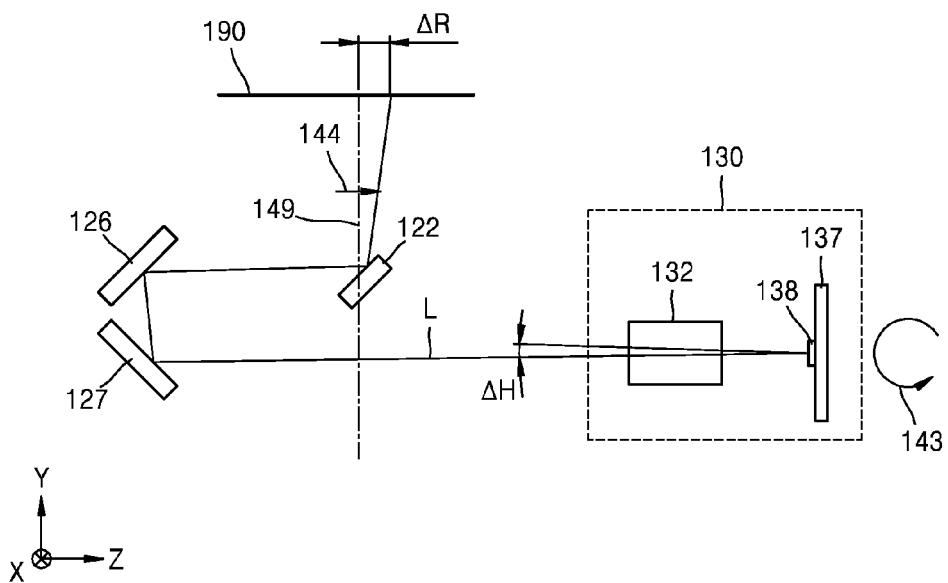
Figure 9C:
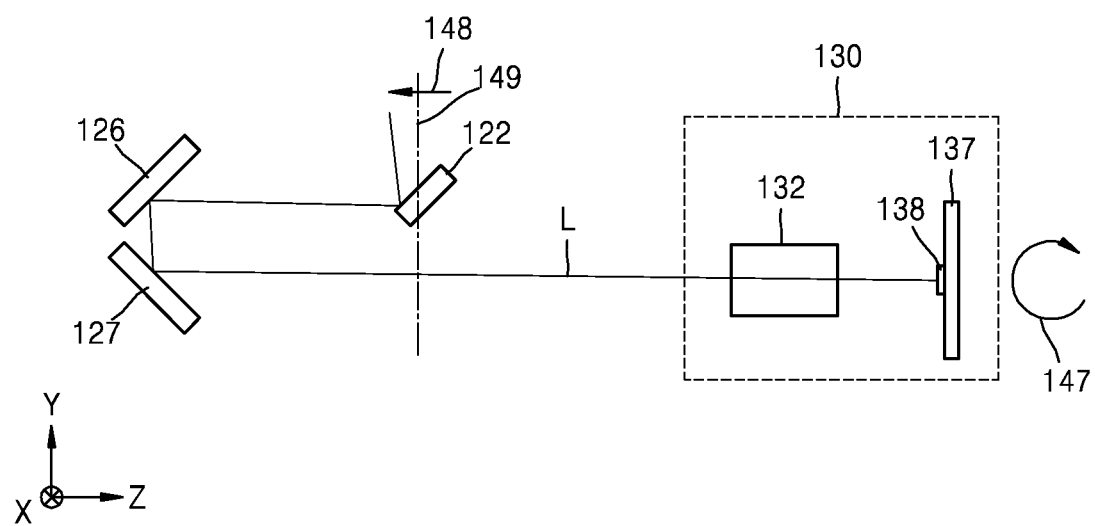

FIGS. 8A through 8C are schematic diagrams for explaining an adjustment of the first adjustment member 134*a* of the imaging unit 130. FIGS. 9A through 9C are schematic diagrams for explaining an adjustment of a scan registration according to the adjustment of the first adjustment member 134*a*.

FIGS. 8A and 9A illustrate the imaging unit 130 of which scan registration is correctly set. In FIG. 8A, the adjustment plate 131 of the imaging unit 130 is placed at a regular position. When the scan registration is correctly set, as shown in FIG. 9A, the light L detected by the image sensor 138 starts at a reference position 149.

Referring to FIGS. 7, 8B, and 9B, the support protrusion 1341 of the first adjustment member 134*a* may be lowered in a downward direction 142 (see FIG. 8B) by rotating the first adjustment member 134*a* in a clockwise direction 141 (see FIG. 8B). Since the adjustment plate 131 is pressed in the downward direction 142 by the pressure member 136, the first adjustable support point P1 of the adjustment plate 131 due to the rotation of the first adjustment member 134*a* in the clockwise direction 141 is lowered in the downward direction 142. Meanwhile, heights of the second adjustable support point P2 and the fixed support point P3 of the adjustment plate 131 are fixed. As a result, the adjustment plate 131 rotates in a counterclockwise direction 143 (see FIGS. 8B and 9B) by using a line R connecting the second adjustable support point P2 and the fixed support point P3 of the adjustment plate 131 as a rotation axis by lowering a support height of the first adjustment member 134*a* in the downward direction 142. For example, as can be seen from FIG. 8B, a side of the adjustment plate 131 which is closer to the image sensor 138 is raised relative to an opposite side of the adjustment plate 131 (a side of the adjustment plate 131 which is closer to first adjustment member 134*a*).

The focusing lens unit 132 and the image sensor 138 may be integrally fixed on the adjustment plate 131, and thus the focusing lens unit 132, the image sensor 138, and the adjustment plate 131 rotate in the counterclockwise direction 143. That is, the focusing lens unit 132 and the image sensor 138 integrally move in the +Y direction. As shown in FIG. 9B, rotation of the focusing lens unit 132 and the image sensor 138 in the counterclockwise direction 143 changes a path of the light L that arrives at the focusing lens unit 132. That is, the light L that arrives at the focusing lens unit 132 and the image sensor 138 that rotate in the counterclockwise direction 143 is light coming from a position biased by AR from the reference position 149 of the document 190 in a first direction 144. As described with reference to FIG. 3, the first traveling unit 123 travels in the scan direction 180 and scans the reading page of the document 190. Thus, the biasing of the light L that arrives at the focusing lens unit 132 and the image sensor 138 in the first direction 144 (i.e., the scan direction or a direction towards the image sensor 138) in the document 190 means that a position at which the document 190 is scanned, i.e. a scan registration, is adjusted in the first direction 144.

Likewise, referring to FIGS. 7, 8C, and 9C, the first adjustable support point P1 of the adjustment plate 131 rises in an upward direction 146 by rotating the first adjustment plate 134*a* in the counterclockwise direction 145. As a result, the adjustment plate 131 and the focusing lens unit 132 and the image sensor 138 installed on the adjustment plate 131 rotate in the clockwise direction 147 by using the line R connecting the second adjustable support point P2 and the fixed support point P3 of the adjustment plate 131 as the rotation axis. For example, as can be seen from FIG. 8C, a side of the adjustment plate 131 which is closer to the image sensor 138 is lowered relative to an opposite side of the adjustment plate 131 (a side of the adjustment plate 131 which is closer to first adjustment member 134*a*). As shown in FIG. 9C, rotation of the focusing lens unit 132 and the image sensor 138 in the clockwise direction 147 changes the path of the light L that arrives at the focusing lens unit 132. That is, the light L that arrives at the focusing lens unit 132 and the image sensor 138 that rotate in the clockwise direction 147 is light coming from a direction biased to a second direction 148 from the reference position 149 of the document stand 111 of FIG. 1, and thus the position at which the document 190 is scanned, i.e. the scan registration, is adjusted in the second direction 148 (i.e., a direction which is opposite of the first direction or scan direction, or a direction away from the image sensor 138).

A skew adjustment of the imaging unit 130 will now be described with reference to FIGS. 10A through 12C.

Figure 10A:
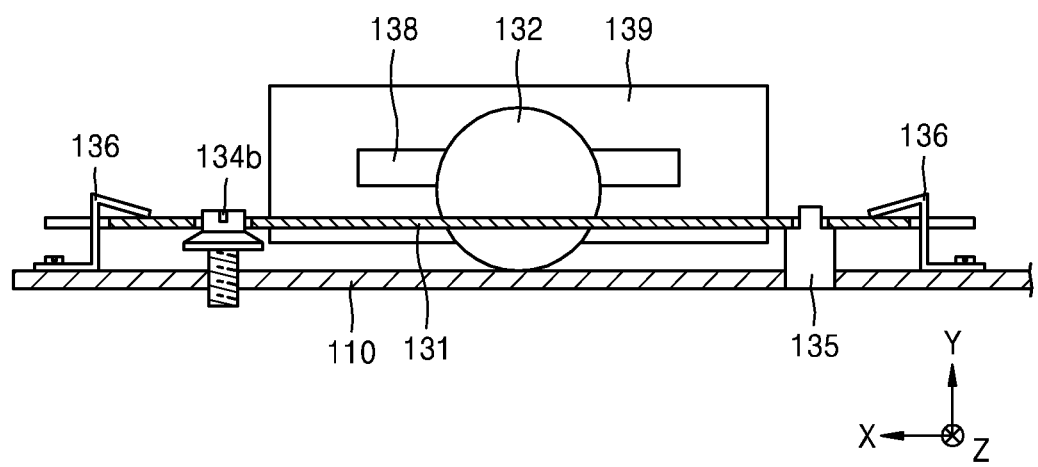
FIGS. 10A through 10C are schematic diagrams for explaining a skew adjustment of a second adjustment member of the imaging unit of FIG. 4.
Figure 10B:
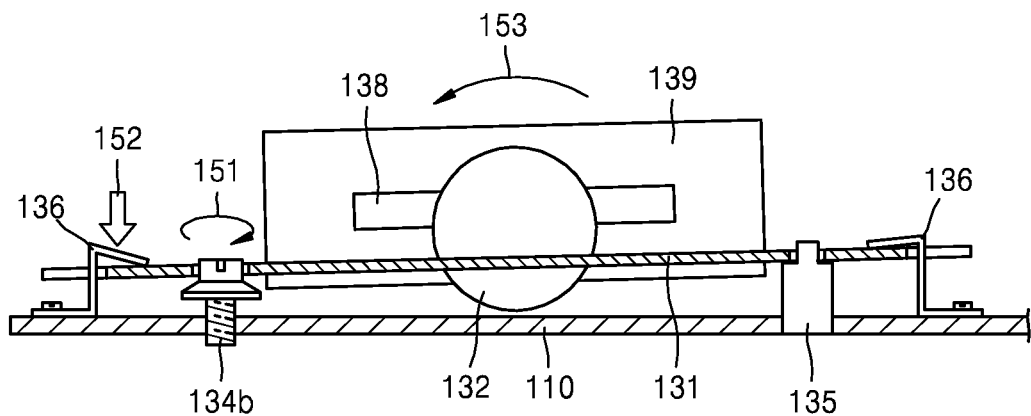
Figure 10C:
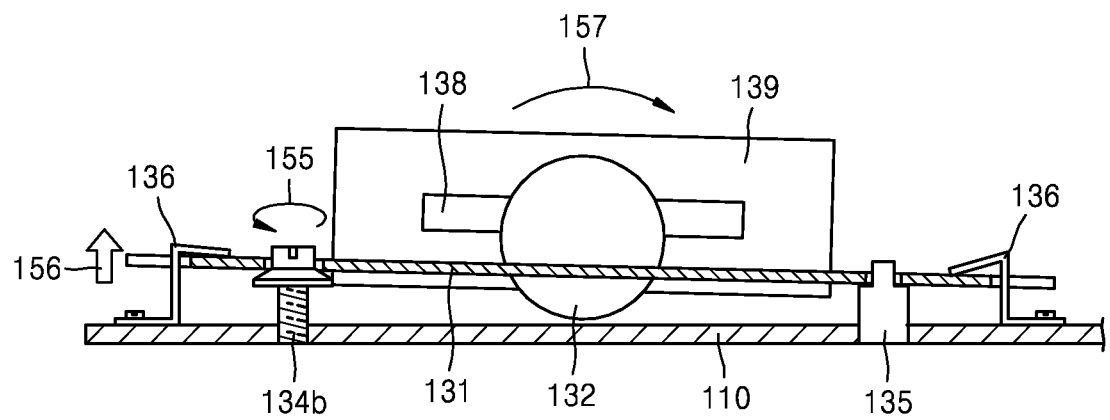
Figure 11A:
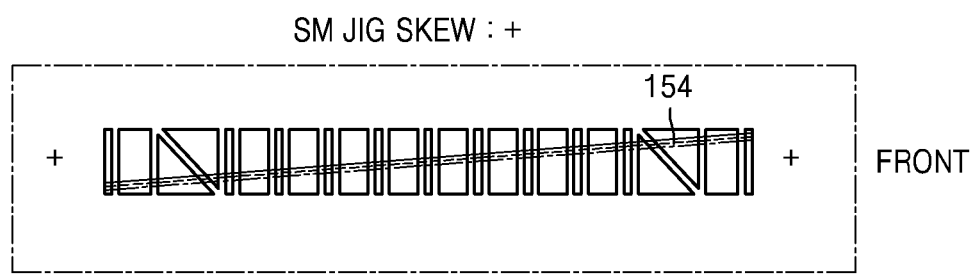
FIGS. 11A through 11C are schematic diagrams for explaining a skew adjustment according to a first adjustment of the second adjustment member of FIG. 10B.
Figure 11B:
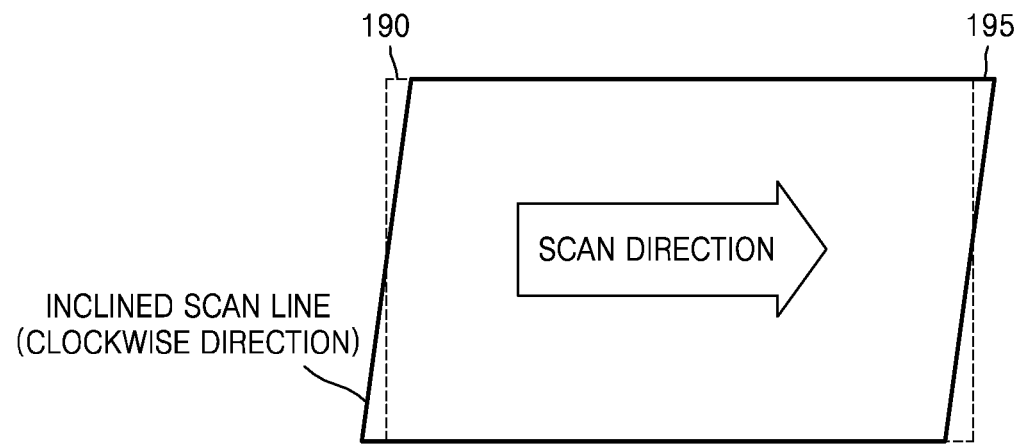
Figure 11C:
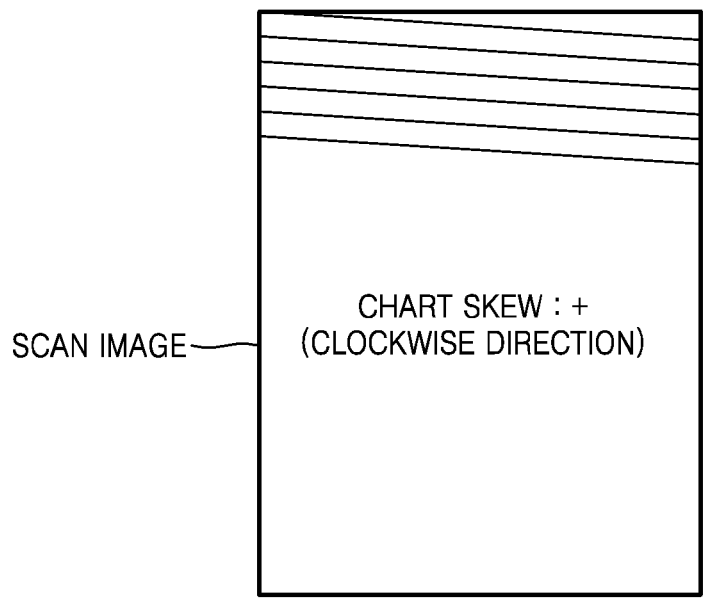
Figure 12A:
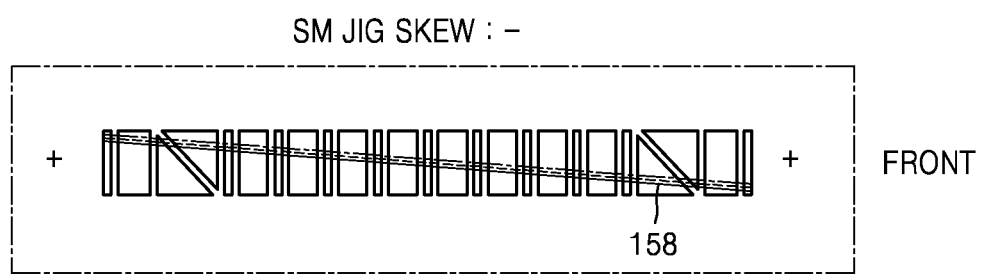
FIGS. 12A through 12C are schematic diagrams for explaining a skew adjustment according to a second adjustment of the second adjustment member of FIG. 10C.
Figure 12B:
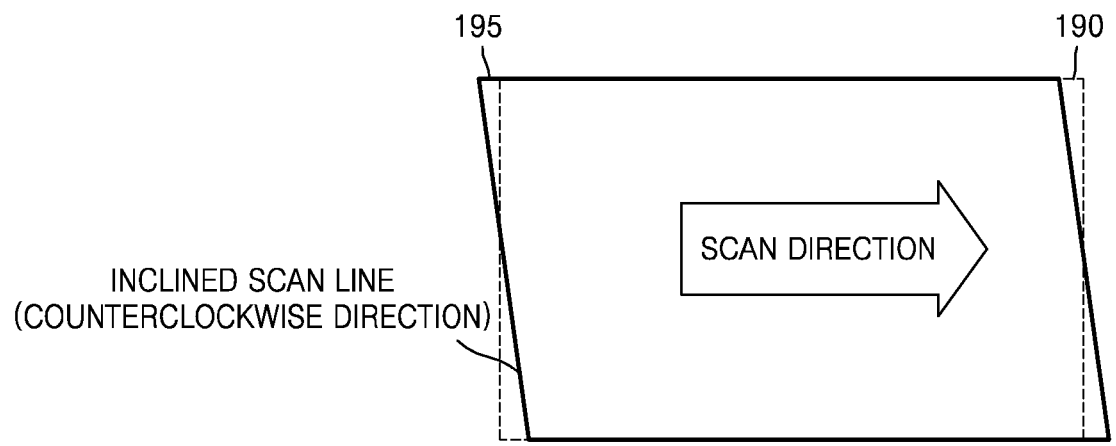
Figure 12C:
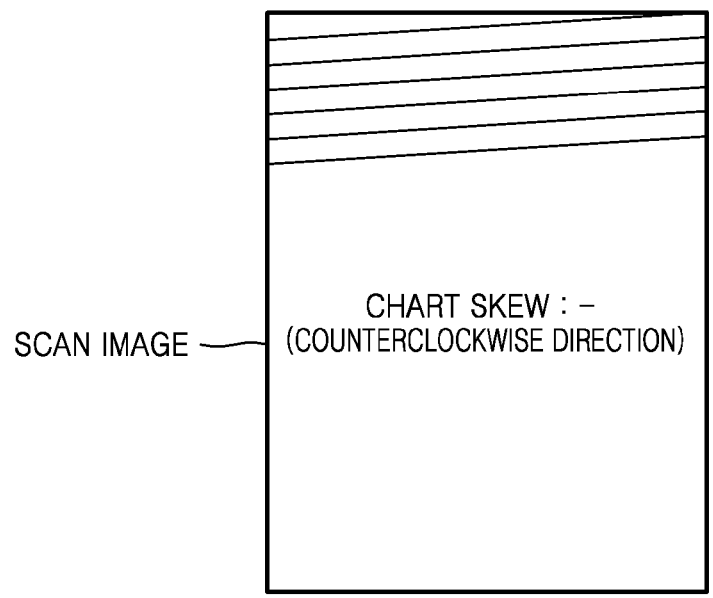

FIGS. 10A through 10C are schematic diagrams for explaining a skew adjustment of the second adjustment member 134*b* of the imaging unit 130 of FIG. 4. FIGS. 11A through 11C are schematic diagrams for explaining a skew adjustment according to a first adjustment of the second adjustment member 134*b* of FIG. 10B. FIGS. 12A through 12C are schematic diagrams for explaining a skew adjustment according to a second adjustment of the second adjustment member 134*b* of FIG. 10C. In FIG. 10A, the imaging unit 130 is placed at a regular position with respect to a rotation from a Z axis.

Referring to FIG. 10B, the second adjustable support point P2 of FIG. 7 is lowered in the downward direction 152 by rotating the second adjustment member 134*b* in a clockwise direction 151. As a result, the adjustment plate 131 and the focusing lens unit 132 and the image sensor 138 installed on the adjustment plate 131 rotate in a counterclockwise direction 153 by using a line connecting the first adjustable support point P1 and the fixed support point P3 of FIG. 7 of the adjustment plate 131 as a rotation axis. For example, as can be seen from FIG. 10B, a side of the adjustment plate 131 which is closer to the height fixing member 135 is raised relative to an opposite side of the adjustment plate 131 (a side of the adjustment plate 131 which is closer to second adjustment member 134*b*). Since the image sensor 138 rotates in the counterclockwise direction 153 by using the second adjustment member 134*b*, a linear image 154 detected by the image sensor 138 is inclined to a long detection surface of the image sensor 138 in a counterclockwise direction, as shown in FIG. 11A. As a result, a reading page 195 scanned from the document 190 has a scan line inclined in the counterclockwise direction, as shown in FIG. 11B, so that a read scan image has a scan line inclined in a clockwise direction, as shown in FIG. 11C.

Referring to FIG. 10C, the second adjustable support point P2 of the adjustment plate 131 rises in an upward direction 156 by rotating the second adjustment member 134*b* in a counterclockwise direction 155. As a result, the adjustment plate 131 and the focusing lens unit 132 and the image sensor 138 installed on the adjustment plate 131 rotate in a clockwise direction 157 by using a line connecting the second adjustable support point P2 and the fixed support point P3 of the adjustment plate 131 as a rotation axis. For example, as can be seen from FIG. 10C, a side of the adjustment plate 131 which is closer to the height fixing member 135 is lowered relative to an opposite side of the adjustment plate 131 (a side of the adjustment plate 131 which is closer to second adjustment member 134b). Since the image sensor 138 rotates in the clockwise direction 157 by using the second adjustment member 134b, the linear image 158 detected by the image sensor 138 is inclined to the long detection surface of the image sensor 138 in a clockwise direction, as shown in FIG. 12A. As a result, the reading page 195 scanned from the document 190 has a scan line inclined in the counterclockwise direction, as shown in FIG. 12B, so that a read scan image has a scan line inclined in a clockwise direction, as shown in FIG. 12C.

As described above, the imaging unit 130 of the disclosed embodiments adjusts a support height of the second adjustment member 134b, thereby adjusting a skew of the imaging unit 130, and thus a skew of a scan image may be correctly aligned in an operation of assembling the imaging unit 130.

Referring to FIGS. 7 and 8B, an adjustment sensitivity S1 of a height adjustment of the first adjustment member 134a may be given as a scan registration variation ΔR in the document 190 with respect to a height adjustment ΔH of the first adjustment member 134a. As described above, the height adjustment ΔH of the first adjustment member 134a may be performed by a rotation made by using the line R connecting the second adjustable support point P2 and the fixed support point P3 of the adjustment plate 131 as a rotation axis, and thus the adjustment sensitivity S1 of the height adjustment of the first adjustment member 134a has the following relationship:

$$S1 = \Delta R/\Delta H = D2/D1 \quad \text{[Equation 1]}$$

wherein, D1 denotes a distance between the first adjustment member 134a and the height fixing member 135 and D2 denotes a distance between the document 190 and the height fixing member 135, with respect to an optical axis direction (i.e., Z direction) of the focusing lens unit 132.

That is, D1 may be defined as an orthogonal distance between the first adjustment member 134a and the line R connecting the second adjustable support point P2 and the fixed support point P3, or as an orthogonal distance between the support point P1 and the line R connecting the second adjustable support point P2 and the fixed support point P3. Alternatively, D1 may be defined as a distance measured along the optical axis direction (i.e., Z direction) between the first adjustment member 134a and the line R connecting the second adjustable support point P2 and the fixed support point P3, or as a distance measured along the optical axis direction (i.e., Z direction) between the support point P1 and the line R connecting the second adjustable support point P2 and the fixed support point P3.

D2 may be defined as an orthogonal distance between the document 190 and the line R connecting the second adjustable support point P2 and the fixed support point P3. Alternatively, D2 may be defined as a distance measured along the optical axis direction (i.e., Z direction) between the document 190 and the line R connecting the second adjustable support point P2 and the fixed support point P3.

Figure 2A:
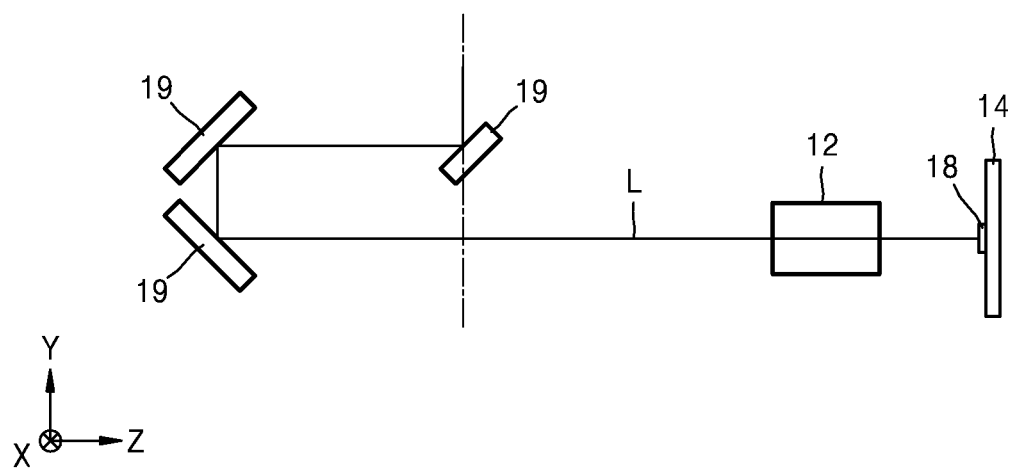
FIGS. 2A through 2C are conceptual diagrams of an image sensor that is adjusted in upper and lower directions in the imaging unit of the conventional image reading apparatus of FIG. 1.
Figure 2B:
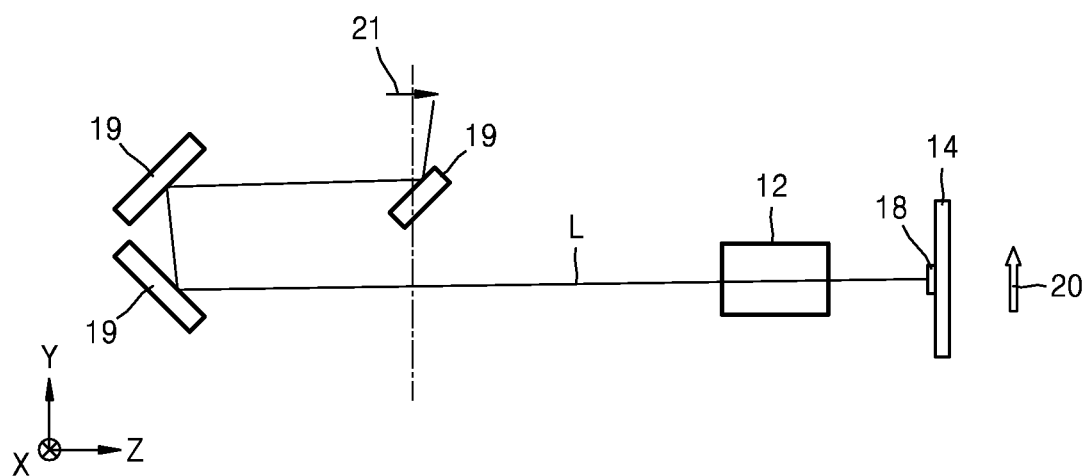
Figure 2C:
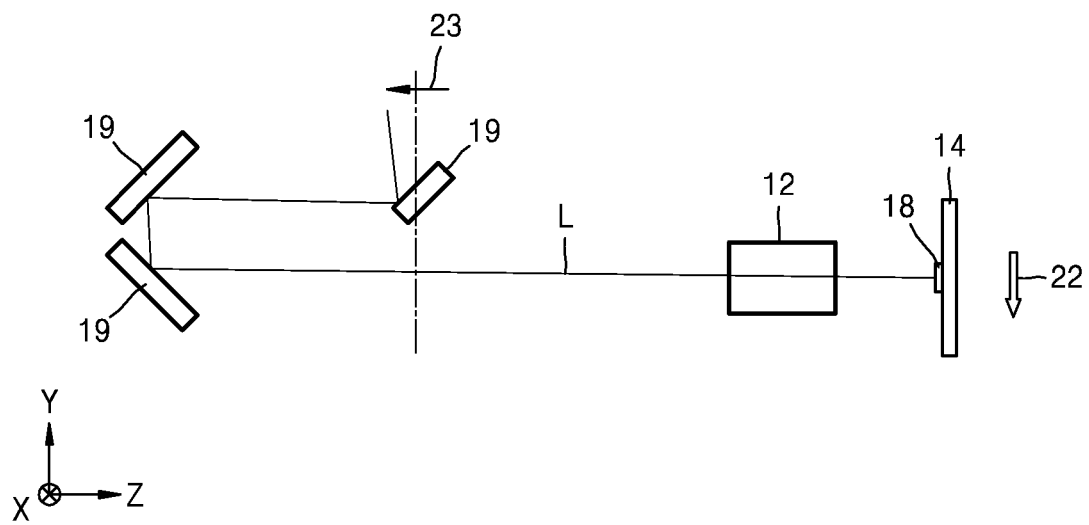

As described in the related art, according to the conventional scan registration adjustment, when the focusing lens 12 of FIGS. 2A through 2C is fixed, a scan registration is adjusted by independently adjusting only a position of the image sensor 18 of FIGS. 2A through 2C in upward and downward directions. In this case, adjustment sensitivity increases by a reciprocal number (inversely) of a reduction rate of the focusing lens 12. For example, if the reduction rate of the focusing lens 12 is 1/10, a conventional adjustment sensitivity is 10.

However, the adjustment sensitivity S1 according to the disclosed embodiments may be detected or determined by a distance relationship between the document 190, the height fixing member 135, and the first adjustment member 134a, irrespective of the reduction rate of the focusing lens 12. For example, when the distance D1 is 100 mm and the distance D2 is 340 mm, the adjustment sensitivity S1 of the height adjustment of the first adjustment member 134a is 4.5, which means that the adjustment sensitivity S1 is about half the conventional adjustment sensitivity of a 0.1 reduction optics.

Likewise, a skew adjustment of the second adjustment member 134b may also be performed by rotating the focusing lens unit 132 and the image sensor 138 as a whole, and thus an adjustment sensitivity of a height adjustment of the second adjustment member 134b may also be determined by a distance relationship according to Equation 1 (e.g., a distance relationship between the second adjustment member 134b and the height fixing member 135) irrespective of the reduction rate of the focusing lens unit 132, thereby reducing an excessive adjustment sensitivity of the conventional adjustment.

According to the conventional adjustment, when the fixing plate 11, on which the focusing lens 12 is installed, is fixed in a housing, the sensor module substrate 14, on which the image sensor 18 is mounted, is fixed to the fixing plate 11 by adjusting a position of the sensor module substrate 14. In this regard, when the sensor module substrate 14 is fixed to the fixing plate 11 by using the screw 16, subtle rotation and movement occur in the bracket 16, which induces an error in a skew or a Y-position. Meanwhile, an adjustment apparatus of the imaging unit 130 according to the disclosed embodiments fixes the sensor module substrate 139 when assembling (i.e., the adjustment plate 131) the focusing lens unit 132 and the image sensor 138, adjusts a position of the adjustment plate 131 to which the focusing lens unit 132 and the image sensor 138 are fixed as a whole, and attaches the adjustment plate 131 to the housing 110, and thus subtle rotation and movement that may occur when the sensor module substrate 139 is fixed to the adjustment plate 131 do not influence a position adjustment of the imaging unit 130.

The pressure member 136 may press the adjustment plate 131 in a downward direction (−Y direction) in the above-described embodiment but is not limited thereto. For example, the pressure member 136 may pressure the adjustment plate 131 in an upward direction (+Y direction), and the first and second adjustment members 134a and 134b and the height fixing member 135 may support the adjustment plate 131 in the downward direction (−Y direction). Alternatively, the first and second adjustment members 134a and 134b and the height fixing member 135 may directly fix the adjustment plate 131 and thus the pressure member 136 may be omitted as desired. As shown in FIG. 4, a pressure member 136 may be disposed on opposite sides of the adjustment plate 131.

In the above-described embodiment, the first adjustment member 134a may be disposed near a front end of the focusing lens unit 132, and the second adjustment member 134b and the height fixing member 135 may be disposed near a rear end of the focusing lens unit 132 but are not limited thereto. In another example, the first adjustment member 134a may be disposed near the rear end of the focusing lens unit 132, and the second adjustment member 134b and the height fixing member 135 may be disposed near the front end of the focusing lens unit 132.

Although the first adjustable support point P1 of the adjustment plate 131 supported by the first adjustment member 134a is positioned on an optical axis of the focusing lens unit 132, as shown in FIG. 7 in the above-described embodiment, the focusing lens unit 132 may be positioned beyond the optical axis. The first adjustable support point P1, the second adjustable support point P2, and the fixed support point P3 correspond to three apexes of an isosceles triangle but are not limited thereto. For example, the fixed support point P3 of the adjustment plate 131 supported by the height fixing member 135 may be positioned on the optical axis of the focusing lens unit 132.

Figure 13:
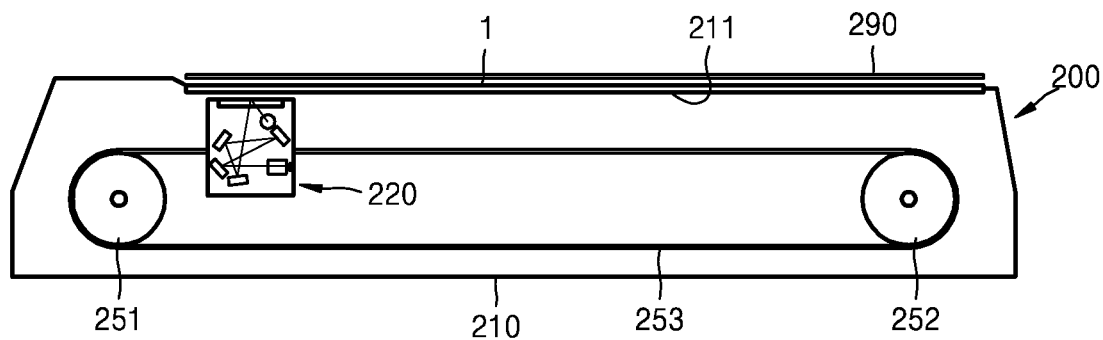
FIG. 13 is a schematic diagram of a configuration of an image reading apparatus according to an embodiment of the disclosure.
Figure 14:
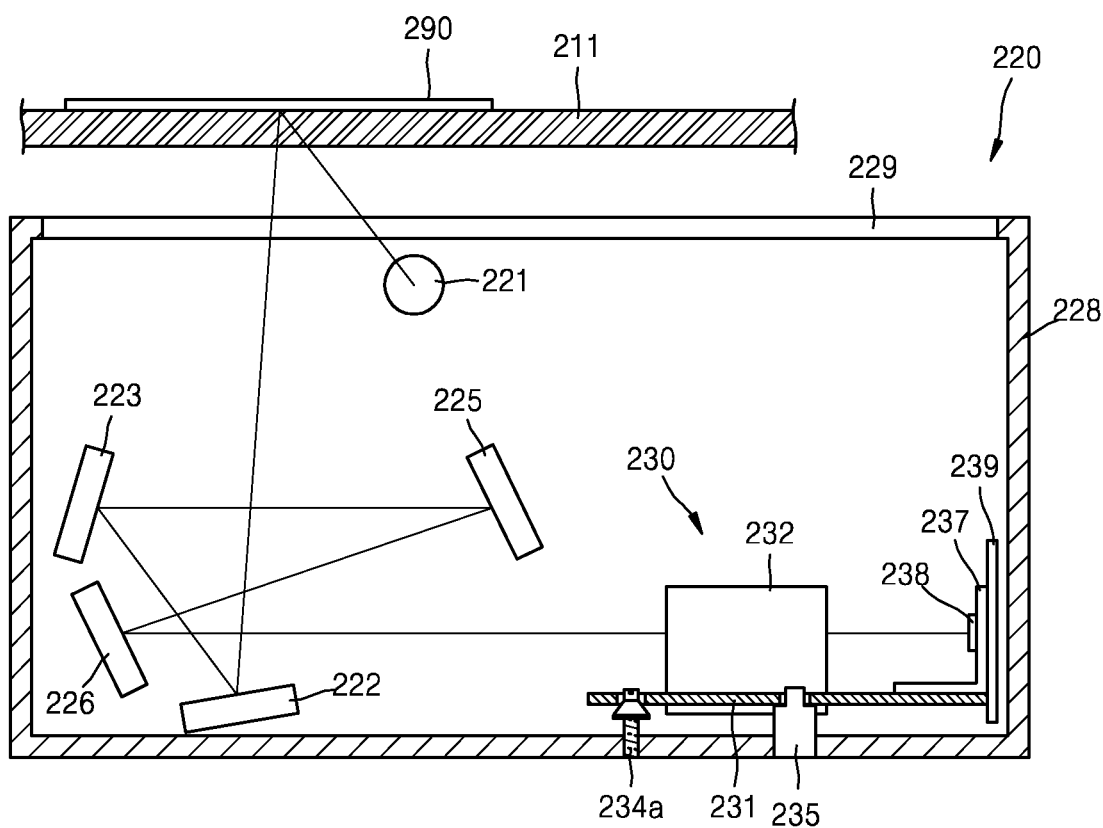
FIG. 14 is a schematic diagram of a reading unit of the image reading apparatus of FIG. 13.

FIG. 13 is a schematic diagram of a configuration of an image reading apparatus 200 according to another embodiment of the disclosure. FIG. 14 is a schematic diagram of a reading unit 220 of the image reading apparatus 200 of FIG. 13.

Referring to FIG. 13, the image reading apparatus 200 may include a housing 210 and the reading unit 220 mounted in the housing 210. A document stand 211, which may be formed of a transparent material, includes an upper side 1, on which a document 290 is placed, of the document stand 211. The reading unit 220 reads an image from the document 290 while moving in a scan direction. A wire 253 that circularly travels by using a pair of pulleys 251 and 252 may be employed as a moving means for moving the reading unit 220. The reading unit 220 may be connected to the wire 253. The reading unit 220 may move in the scan direction by rotating one of the pulleys 251 and 252 by using a driving motor (not shown). A timing belt may be employed instead of the wire 253. The moving means for moving the reading unit 220 is not limited to that shown in FIG. 13.

Referring to FIG. 14, the reading unit 220 may include an imaging unit 230 installed on a base frame 228. Further, the reading unit 220 may include a light source 221 that emits illumination light through an upper side 229 of the imaging unit 230 to the document 290 and first through fourth reflective mirrors 222, 223, 225, and 226 that are light path change members used to guide light reflected from the document 290 toward the imaging unit 230. The first through fourth reflective mirrors 222, 223, 225, and 226 may change light paths several times to reduce the reading unit 220 to a compact size. The number of first through fourth reflective mirrors 222, 223, 225, and 226 is four but is not limited thereto, and may include more or less than four reflective mirrors.

The imaging unit 230 has the substantially same structure as described with reference to FIG. 4 above, and thus a brief description thereof will now be provided. That is, the imaging unit 230 may include a focusing lens unit 232 and an image sensor 238. The image sensor 238 may be mounted on a sensor module substrate 239. The sensor module substrate 239 may be coupled to an adjustment plate 231 by using a bracket 237. The sensor module substrate 239 may be fixed to the adjustment plate 231 by using the bracket 237 when a position of the focusing lens unit 232 is adjusted in an optical axis direction in an operation of assembling the sensor module substrate 239 to the adjustment plate 231. The adjustment plate 231 may be installed on the base frame 228. The adjustment plate 231 may be supported on the base frame 228 at three points by using a first adjustment member 234a, the second adjustment member (see 134b of FIG. 4), and a height fixing member 235. The first adjustment member 234a may be disposed near a front end of the focusing lens unit 232. The second adjustment member and the height fixing member 235 may be disposed at a rear end of the focusing lens unit 232. The adjustment member 231 may be pressed by a pressure member (see 136 of FIG. 4) that is not shown in an opposite direction to a direction supported by the first adjustment member 234a and the second adjustment member. The first adjustment member 234a and the second adjustment member may adjust a scan registration and a skew of the imaging unit 230 in the same manner as described in the embodiments disclosed herein.

The document 290 placed on the document stand 211 may be provided in the image reading apparatus 200 of the embodiment described with reference to FIGS. 13 and 14 but is not limited thereto.

Figure 15:
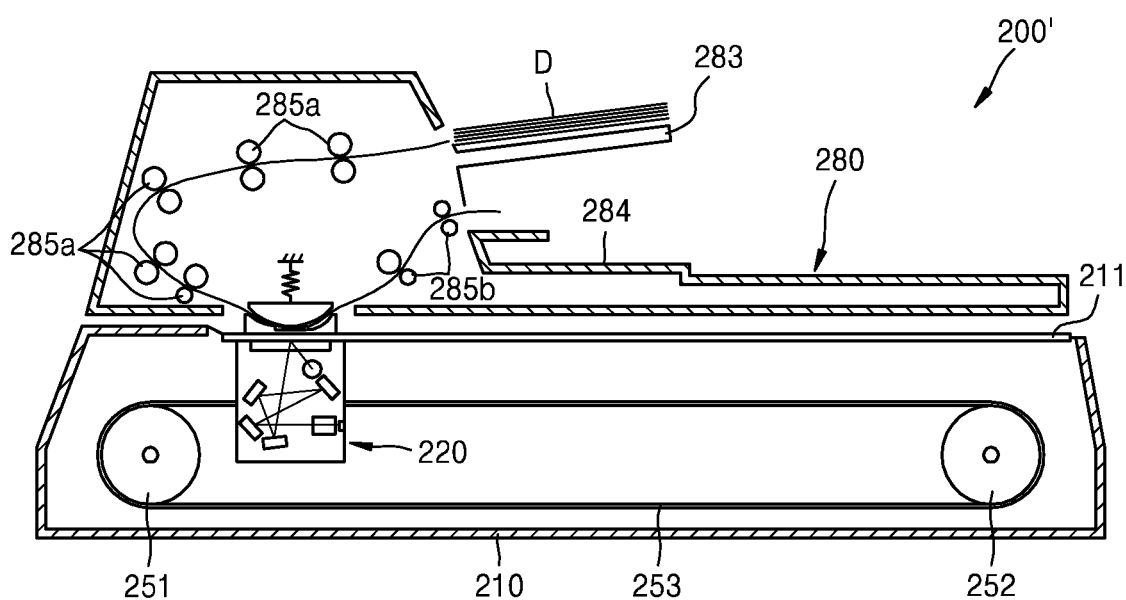
FIG. 15 is a schematic diagram of a configuration of an image reading apparatus according to an embodiment of the disclosure.

FIG. 15 is a schematic diagram of a configuration or arrangement of an image reading apparatus 200' according to an embodiment of the disclosure. Referring to FIG. 15, the image reading apparatus 200' further may include a document feeding device 280 provided on the document stand 211, compared to the image reading apparatus 200 of the embodiment described with reference to FIGS. 13 and 14 above. The document feeding device 280 takes out a document D from a document supply stand 283, feeds the document D to a reading region 286 in which the reading unit 220 is positioned by using a plurality of feeding rollers 285a, and sends out the document D of which reading is completed to a document load stand 284 by using a plurality of sending (discharging) rollers 285b. The document feeding device 280 may include an auto-document feeder (ADF), which is not in detail illustrated, for withdrawing the document D loaded on the document supply stand 283 one-by-one. In the embodiment of FIG. 15, since the reading unit 220 does not need to move, the image reading apparatus 200 of the embodiment described with reference to FIGS. 13 and 14 above may exclude a moving means for moving the reading unit 220. Additionally, the disclosure is not limited to the configurations or arrangements of the image reading apparatuses of FIGS. 13 to 15. For example, image reading apparatuses may use different paths to move a document, may include a duplex path, additional or fewer rollers, etc.

Figure 16:
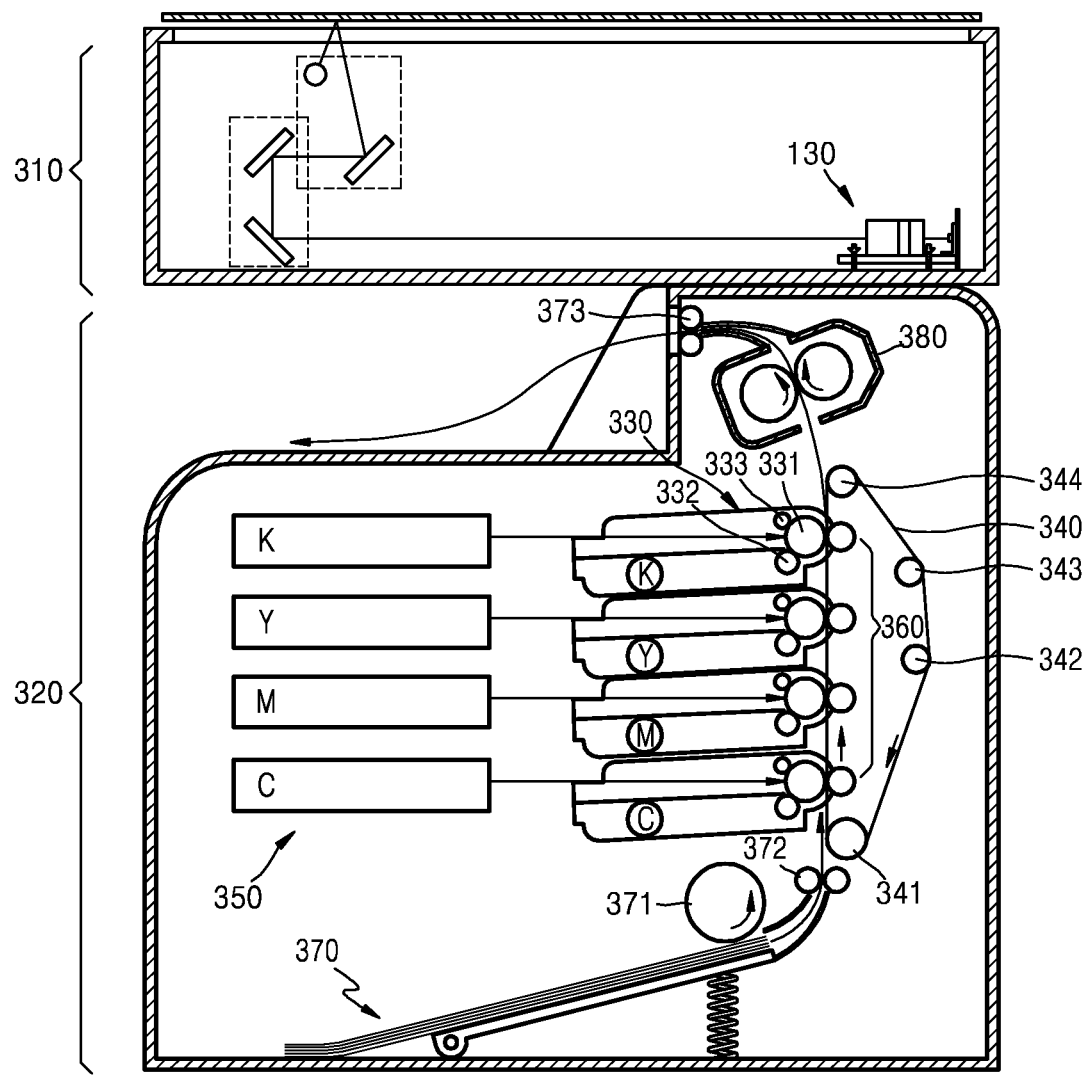
FIG. 16 is a schematic diagram of a configuration of an image forming apparatus according to an embodiment of the disclosure.

FIG. 16 is a schematic diagram of a configuration of an image forming apparatus according to an embodiment of the disclosure.

Referring to FIG. 16, the image forming apparatus may include an image reading apparatus 310 that reads image information of a document and a printing unit 320 that prints an image on a sheet according to an electrophotographic process. An apparatus described with reference to FIGS. 1 through 5 may be employed as the image reading apparatus 310. The image reading apparatus 310 may be positioned, for example, on an upper part of the printing unit 320. The information read by the image reading apparatus 310 may be transmitted to a host that is not shown through a communication means (for example, via a wired connection using a universal serial bus (USB) for example, or over a wireless connection using a wireless network (e.g., BLUETOOTH), etc.) The information read by the image reading apparatus 310 is printed on the sheet by using the printing unit 320, and thus the image forming apparatus may function as a copier. The image forming apparatus may further include a line controller to perform a function of a fax machine that transmits the information read from the document through a public line. Thus, the image reading apparatus may be part of a multifunctional apparatus which performs two or more functions (e.g., printing, copying, faxing, scanning, etc.)

The printing unit 320 of the non-limiting embodiment of FIG. 16 may include four developing units 330 (330C 330M, 330Y, and 330K) that respectively contain toners of different colors, for example, cyan C, magenta M, yellow Y, and black K, to print a color image, and four exposing units 350 (350C, 350M, 350Y, and 350K) respectively corresponding to the four developing units 330C, 330M, 330Y, and 330K.

Each of the four developing units 330C, 330M, 330Y, and 330K may include a photosensitive drum 331 that is an image medium body and a developing roller 332 for developing an electrostatic latent image. A charge bias is applied to charge rollers 333 so as to charge outer circumferences of the photosensitive drums 331 to a uniform potential. A corona discharger (not shown) may be employed instead of the charge rollers 333. The developing rollers 332 supply the toner to the photosensitive drums 331 by attaching toner to the outer circumferences of the developing rollers 332. A developing bias is applied to the developing rollers 332 so as to supply the toner to the photosensitive drums 331. Although not shown, the developing units 330C, 330M, 330Y, and 330K may further include supply rollers that attach the toner contained therein to the developing units 330C 330M, 330Y, and 330K, restriction means that restrict an amount of the toner attached to the developing units 330C, 330M, 330Y, and 330K, and agitation units (not shown) that feed the toner contained therein to the supply rollers and/or the developing rollers 332. Although not shown, the developing units 330C, 330M, 330Y, and 330K may include cleaning blades that remove the toner remaining on the outer circumferences of the photosensitive drums 331 and accommodation spaces for accommodating the removed toner.

As a non-limiting example, a transfer unit may include a sheet conveyance belt 340 and four transfer rollers 360. The sheet conveyance belt 340 faces the outer circumferences of the photosensitive drums 331 that are exposed outside the developing units 330C, 330M, 330Y, and 330K. The sheet conveyance belt 340 may be supported by a plurality of support rollers 341, 342, 343, and 344 and circularly travels. The sheet conveyance belt 340 may be installed in a perpendicular direction, for example. The four transfer rollers 360 may be disposed at positions facing the photosensitive drums 331 of the developing units 330C, 330M, 330Y, and 330K with the sheet conveyance belt 340 disposed therebetween. A transfer bias may be applied to the four transfer rollers 360. The exposing units 350C, 350M, 350Y, and 350K respectively scan light corresponding to the image information of the cyan C, magenta M, yellow Y, and black K colors to the photosensitive drums 331 of the developing units 330C, 330M, 330Y, and 330K. For example, laser scanning units (LSUs) that use a laser diode as a light source may be employed as the exposing units 350C, 350M, 350Y, and 350K.

A color image forming process of the above-described structure will be described below.

The photosensitive drum 331 of each of the developing units 330C, 330M, 330Y, and 330K may be charged to a uniform potential by using the charge bias applied to the charge rollers 333. The exposing units 350C, 350M, 350Y, and 350K scan light respectively corresponding to the image information of the cyan C, magenta M, yellow Y, and black K colors to the photosensitive drums 331 of the developing units 330C, 330M, 330Y, and 330K respectively to form an electrostatic latent image. A developing bias may be applied to the developing rollers 332. The toner attached to the outer circumferences of the developing rollers 332 may be attached to the electrostatic latent image to form toner images of the cyan C, magenta M, yellow Y, and black K colors on the photosensitive drums 331 of the developing units 330C, 330M, 330Y, and 330K.

The sheet may be taken out of a cassette 370 by using a pickup roller 371. The sheet comes in to the sheet conveyance belt 340 by using a feeding roller 372. The sheet is attached to a surface of the sheet conveyance belt 340 by using an electrostatic force and may be fed at the same speed as a traveling line speed of the sheet conveyance belt 340.

For example, a leading end of the sheet arrives at a transfer nip facing the transfer roller 360 in accordance with a time at which a leading end of the toner image of the cyan C color formed on the outer circumference of the photosensitive drum 331 of the developing unit 330C arrives at the transfer nip. If the transfer bias is applied to the transfer roller 360, the toner image formed on the photosensitive drum 331 is transferred to the sheet. Since the sheet is fed, the toner images of the cyan C, magenta M, yellow Y, and black K colors formed on the photosensitive drums 331 of the developing units 330C, 330M, 330Y, and 330K sequentially overlap and may be transferred to the sheet so that a color toner image is formed on the sheet.

The color toner image transferred to the sheet remains on a surface of the sheet by the electrostatic force. A fusing unit 380 uses heat and pressure to fuse the color toner image on the sheet. The completely fused sheet is discharged outside the image forming apparatus by using a discharge roller 373. For example, the toner images formed on the photosensitive drums 331 may be directly transferred to the sheet without an intermediate transfer process but are not limited thereto. The toner images formed on the photosensitive drums 331 may be transferred to the sheet after being transferred to an intermediate transfer medium that is not shown.

The printing unit 320 of the image forming apparatus of the above-described embodiment forms a color image by using a single path method but is not limited thereto. A printing unit that forms the color image by using a multipath method may be employed. A printing unit that forms a mono color image may be employed.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the disclosure have been described with reference to the figures, it will be understood by those of ordinary skill in the art that various changes in form and details may be made therein without departing from the spirit and scope of the disclosure as defined by the following claims.

What is claimed is:

1. A position adjustment apparatus to couple an imaging unit, which includes an image sensor and a focusing lens unit, to a base frame so as to adjust a position of the imaging unit, the position adjustment apparatus comprising:
   an adjustment frame on which the focusing lens unit and the image sensor are installed;
   a height fixing member to couple the adjustment frame to the base frame to fix a height of the adjustment frame at a fixed support position; and
   first and second adjustment members to couple the adjustment frame to the base frame to adjust the height of the adjustment frame at first and second adjustable support positions.

2. The position adjustment apparatus of claim 1, wherein the adjustment frame is supported at three points with respect to the base frame.

3. The position adjustment apparatus of claim 1, wherein the first adjustment member is positioned near a front end of the focusing lens unit, and the second adjustment member and the height fixing member are positioned near a rear end of the focusing lens unit.

4. The position adjustment apparatus of claim 1, wherein the first adjustable support position is disposed along an optical axis of the focusing lens unit, and the fixed support position and the second adjustable support position deviate from the optical axis of the focusing lens unit.

5. The position adjustment apparatus of claim 1, wherein the first adjustment member adjusts a scan registration position of a document image of the imaging unit, and the second adjustment member adjusts a scan skew of the document image of the imaging unit.

6. The position adjustment apparatus of claim 4, wherein the fixed support position and the second adjustable support position are on a line perpendicular to the optical axis of the focusing lens unit.

7. The position adjustment apparatus of claim 6, wherein the fixed support position, the first adjustable support position, and the second adjustable support position are aligned at apexes of an isosceles triangle.

8. The position adjustment apparatus of claim 1, further comprising:
a pressure member to press the adjustment frame with respect to the base frame,
wherein the first and second adjustment members and the height fixing member support the adjustment frame in an opposite direction to a direction in which the adjustment frame is pressed to the base frame.

9. The position adjustment apparatus of claim 8, wherein the pressure member is an elastic pressure member that elastically presses the adjustment frame.

10. The position adjustment apparatus of claim 1, wherein the first and second adjustment members are screw members.

11. The position adjustment apparatus of claim 1, wherein the adjustment frame comprises:
an adjustment plate that is supported by the first and second adjustment members and the height fixing member, and on which the focusing lens unit is installed,
a sensor module substrate on which the image sensor is installed, and
a bracket to couple the sensor module substrate to the adjustment plate.

12. The position adjustment apparatus of claim 11, wherein the bracket couples the sensor module substrate to the adjustment plate to fix the sensor module substrate with respect to a rotation direction around the optical axis of the focusing lens unit and upper and lower directions of a plate surface of the adjustment plate.

13. The position adjustment apparatus of claim 12, wherein the bracket couples the sensor module substrate to the adjustment plate to adjust a distance from the sensor module substrate to an optical axis direction of the focusing lens unit.

14. The position adjustment apparatus of claim 1, wherein the focusing lens unit is a reduction optical system.

15. The position adjustment apparatus of claim 1, wherein the image sensor is a line image sensor having an extending line sensor surface, and is aligned such that a length direction of the line sensor surface is the same as a main scan direction of a document image.

16. An imaging unit comprising:
a base frame;
an image sensor to read a document image;
a focusing lens unit to form the document image by using the image sensor; and a position adjustment apparatus to couple the focusing lens unit and the image sensor to the base frame so as to adjust positions of the focusing lens unit and the image sensor,
wherein the position adjustment apparatus comprises:
an adjustment frame on which the focusing lens unit and the image sensor are installed;
a height fixing member to couple the adjustment frame to the base frame to fix a height of the adjustment frame at a fixed support position; and
first and second adjustment members to couple the adjustment frame to the base frame to adjust the height of the adjustment frame at first and second adjustable support positions.

17. An image reading apparatus comprising:
a document stand; and
an imaging unit to detect an image from the document stand,
wherein the imaging unit comprises:
a base frame;
an image sensor to read a document image;
a focusing lens unit to form the document image by using the image sensor; and
an adjustment frame on which the focusing lens unit and the image sensor are installed,
wherein the adjustment frame is supported at first, second, and third support positions with respect to the base frame, and a height of the adjustment frame is adjustable at the first and the second support positions with respect to the base frame.

18. The image reading apparatus of claim 17, further comprising:
a light path changing unit to change a light path to allow light coming from the document stand to face the imaging unit.

19. The image reading apparatus of claim 18, wherein the imaging unit is fixed to the document stand, and
wherein the light path changing unit comprises:
a first traveling unit to move at a scan speed in a scan direction with respect to the document stand, and
a second traveling unit to move at half the scan speed in the scan direction with respect to the document stand.

20. The image reading apparatus of claim 18, wherein the imaging unit and the light path changing unit travel in a scan direction with respect to the document stand.

21. The image reading apparatus of claim 18, further comprising:
a document feeding apparatus to move a document to the document stand.

22. The image reading apparatus of claim 17, wherein a height of the adjustment frame is fixed at the third support position with respect to the base frame, the first support position is disposed along an optical axis of the focusing lens unit, and the second support position and the third support position deviate from the optical axis of the focusing lens unit.

23. The image reading apparatus of claim 22, wherein the second support position and the third support position are on a line perpendicular to the optical axis of the focusing lens unit.

24. An image forming apparatus comprising:
an image reading apparatus which includes a document stand and an imaging unit to detect an image from the document stand; and a printing unit to print an image on a sheet according to an electrophotographic process, wherein the imaging unit comprises:

a base frame;

an image sensor to read a document image;

a focusing lens unit to form the document image by using the image sensor; and a position adjustment apparatus to couple the focusing lens unit and the image sensor to the base frame so as to adjust positions of the focusing lens unit and the image sensor, wherein the position adjustment apparatus comprises:

an adjustment frame on which the focusing lens unit and the image sensor are installed, wherein the adjustment frame is supported at first, second, and third support positions with respect to the base frame, and a height of the adjustment frame is adjustable at the first and the second support positions with respect to the base frame.

25. The image forming apparatus of claim 24, wherein the image forming apparatus is a copier or a multifunctional machine.

26. The image forming apparatus of claim 24, wherein a height of the adjustment frame is fixed at the third support position with respect to the base frame, the first support position is disposed along an optical axis of the focusing lens unit, and the second support position and the third support position deviate from the optical axis of the focusing lens unit.

27. The image forming apparatus of claim 26, wherein the second support position and the third support position are on a line perpendicular to the optical axis of the focusing lens unit.

28. A method for adjusting a position of an imaging unit coupled to a base frame, the method comprising:

fixing a height of an adjustment frame, on which a focusing lens unit and an image sensor of the imaging unit are installed, using a height fixing member which couples the adjustment frame to the base frame at a fixed support position; and rotating a first adjustment member which couples the adjustment frame to the base frame at a first adjustable support position, causing one end of the adjustment frame to be raised or lowered relative to the fixed support position.

29. The method of claim 28, wherein, rotating the first adjustment member in a first direction causes the image sensor, focusing lens unit, and the adjustment frame to be rotated at a same time in a second direction which is opposite of the first direction.

30. The method of claim 29, wherein, rotating the first adjustment member further comprises adjusting a position at which a document is scanned by the imaging unit, in a scan direction of the document or a direction opposite of the scan direction.

31. The method of claim 28, further comprising:

rotating a second adjustment member which couples the adjustment frame to the base frame at a second adjustable support position, causing another end of the adjustment frame to be raised or lowered relative to the fixed support position.

32. The method of claim 31, wherein, rotating the second adjustment member in a first direction causes the image sensor, focusing lens unit, and the adjustment frame to be rotated at a same time in a second direction which is opposite of the first direction.

33. The method of claim 32, wherein, rotating the second adjustment member further comprises adjusting a skew of the imaging unit and aligning a skew of a scan image.

* * * * *